US010768053B2

(12) United States Patent
Valdez

(10) Patent No.: US 10,768,053 B2
(45) Date of Patent: Sep. 8, 2020

(54) TELESCOPIC THERMOMETER

(71) Applicant: Raymond Armstrong Valdez, Indio, CA (US)

(72) Inventor: Raymond Armstrong Valdez, Indio, CA (US)

(*) Notice: Subject to any disclaimer, the term of this patent is extended or adjusted under 35 U.S.C. 154(b) by 197 days.

(21) Appl. No.: 16/117,780

(22) Filed: Aug. 30, 2018

(65) Prior Publication Data

US 2019/0064001 A1    Feb. 28, 2019

Related U.S. Application Data

(60) Provisional application No. 62/551,797, filed on Aug. 30, 2017, provisional application No. 62/626,182, filed on Feb. 5, 2018.

(51) Int. Cl.
| | |
|---|---|
| *G01K 13/00* | (2006.01) |
| *G01K 1/14* | (2006.01) |
| *G01K 7/36* | (2006.01) |
| *G01K 1/08* | (2006.01) |
| *G01K 1/02* | (2006.01) |
| *G01K 1/06* | (2006.01) |

(52) U.S. Cl.
CPC ............ *G01K 1/146* (2013.01); *G01K 1/024* (2013.01); *G01K 1/08* (2013.01); *G01K 7/36* (2013.01); *G01K 1/06* (2013.01)

(58) Field of Classification Search
CPC .... G01K 11/32; G01K 11/3206; G01K 13/02; G01K 2011/322; G01K 2011/324; G01K 1/14; G01K 1/146; G01K 13/06; G01K 13/00; G01N 2021/4742; G01N 2201/088
See application file for complete search history.

(56) References Cited

U.S. PATENT DOCUMENTS

| | | | | |
|---|---|---|---|---|
| 2,902,860 A | * | 9/1959 | Glass | G01K 1/14 374/208 |
| 3,306,239 A | * | 2/1967 | Martin, Jr. | A01C 11/02 111/115 |
| 3,339,297 A | * | 9/1967 | Stinn | G09B 1/08 434/190 |
| 4,282,754 A | * | 8/1981 | Provasnik | F02B 77/089 338/22 R |
| 4,630,449 A | * | 12/1986 | Adams | G01K 3/005 340/585 |
| 4,688,949 A | * | 8/1987 | Hatakenaka | G01K 7/223 338/28 |

(Continued)

FOREIGN PATENT DOCUMENTS

| | | | | |
|---|---|---|---|---|
| CN | 106353064 A | * | 1/2017 | |
| DE | 102010038734 A1 | * | 2/2012 | G01B 11/026 |
| JP | 36124333 A | * | 10/1986 | |

*Primary Examiner* — Gail Kaplan Verbitsky

(74) *Attorney, Agent, or Firm* — Eric Hanscom

(57) ABSTRACT

The present specification describes a telescopic thermometer that allows a user to measure surface or air temperature in hardly accessible places. The telescopic thermometer includes a telescopic body with a temperature sensor attached at remote end of the telescopic body and a magnet used to temporarily attach the thermometer to a place near the place of measurement for hands free operation. A display unit at user end displays the temperature readings received from the sensor. The temperature readings are transmitted to a networked device for storing and processing.

17 Claims, 4 Drawing Sheets

(56) References Cited

U.S. PATENT DOCUMENTS

| | | | | |
|---|---|---|---|---|
| 4,704,896 | A * | 11/1987 | Parsons | G01B 13/16 |
| | | | | 29/714 |
| 5,634,719 | A * | 6/1997 | La Neve | G01K 1/146 |
| | | | | 116/216 |
| 6,367,974 | B1 * | 4/2002 | Lin | G01K 1/10 |
| | | | | 374/150 |
| 9,743,980 | B2 * | 8/2017 | Diamant | A61B 18/1492 |
| 10,397,989 | B1 * | 8/2019 | Albahkali | H05B 6/6452 |
| 10,473,529 | B2 * | 11/2019 | Bronk | G01K 1/14 |
| 2008/0175301 | A1 * | 7/2008 | Chen | G01J 5/02 |
| | | | | 374/121 |
| 2010/0027582 | A1 * | 2/2010 | Lane | G07C 3/08 |
| | | | | 374/142 |
| 2015/0308879 | A1 * | 10/2015 | Pistone | F25B 45/00 |
| | | | | 73/292 |
| 2016/0178445 | A1 * | 6/2016 | Shiraki | G01K 1/08 |
| | | | | 374/208 |
| 2016/0377490 | A1 * | 12/2016 | Nivala | G01K 1/024 |
| | | | | 374/155 |
| 2017/0209173 | A1 * | 7/2017 | Parys | A61B 1/303 |

\* cited by examiner

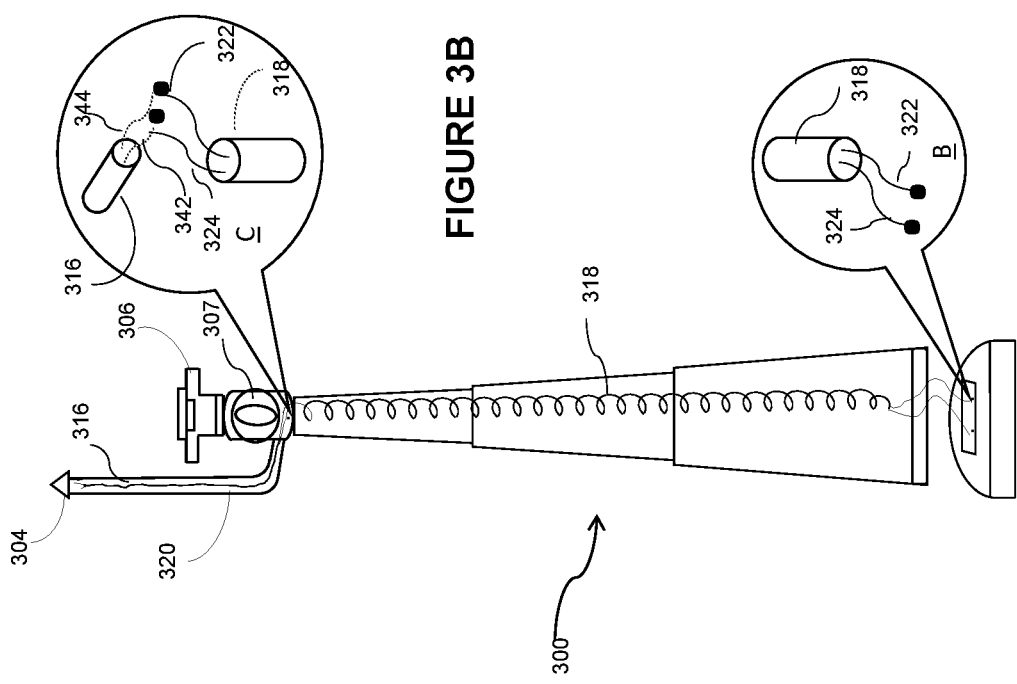

TELESCOPIC THERMOMETER

RELATED PATENT APPLICATIONS

This patent application claims priority from U.S. Provisional Application 62/551,797 filed Aug. 30, 2017 and U.S. Provisional Application 62/62,182 filed Feb. 5, 2018.

FIELD OF THE INVENTION

The present invention relates to temperature measuring devices, and in particular, to temperature measuring devices for maintenance and repair of air conditioning units.

BACKGROUND OF THE INVENTION

Conventional hand-held thermometers may facilitate measuring the temperature but are not very accurate in measuring the temperature of the surfaces or of the air flows. Also, the conventional hand-held thermometers are not effective in measuring temperature the temperature of remote places as the distance between the thermometer and the place of interest can cause errors in the reading. This a significant problem for HVAC (Heating, Ventilation and Air Conditioning) devices.

There are two types of thermometers that are most commonly used in the HVAC field for measuring the temperature in an operating forced air unit. A first type is the electronic probe thermometer, more commonly recognized as a meat thermometer. This type of thermometer has a rigid pointy probe (metal probe) that one, in cooking applications, would stick into the center of a cooked roast. The electronic probe thermometer works by generating a small current across the electrodes of the metal probe, measuring how much current flows through the probe and thus the electrical resistance across the probe. Inside the thermometer, a microchip is used to convert this resistance into a temperature measurement that is displayed on the screen of the thermometer. The screen is provided on the opposite side of the probe, in front of the user, for enabling the user to see and record the temperature. This type of thermometer is also used in the HVAC field, and it comes in different shapes of housing. The electronic probe thermometer is without a doubt the most accurate thermometer and the most trusted for accuracy by a HVAC technician for many years.

However, all versions of electronic thermometers in the HVAC field use the same rigid straw-like metal probe with a pointy end to obtain air temperatures.

A disadvantage of using an electronic probe thermometer for obtaining air temperatures for HVACs is when a HVAC technician is seeking air temperature in a conditioned space. In this case, in most settings (90%), the technician needs a ladder because the metal air vent register that conditioned air is blowing out of, is in many cases over 10 feet above the floor. Therefore, in this scenario a technician would walk into a home, set up a ladder, climb the ladder to get within arm's length of the of an air supply grill to measure the temperature. He/she would then pull out a probe thermometer and insert the rigid probe inside, or very near, the air vent register so that the stream of conditioned air passes over the probe triggering the display unit to show the temperature on the screen. However, the correct temperature of the air is not provided immediately; it can take a few minutes for the probe thermometer to read the true temperature of the air. The main factor for the time delay is that the thermometer has been stored in a tool bag that has been sitting in a hot environment outdoors therefore heating up the probe of the thermometer. So, when being used to measure cold air, the cold air stream must first cool down the hot probe then bring it down to conditioned air temp. The hotter the probe, the longer the wait for accurate air temperature blowing from the air vent. Because of this, an HVAC technician might have his arms up holding the probe in a fixed position on a ladder for up to 4 minutes. This can be very tiering and frustrating for the technician.

To reduce the strain of the art held-out for such a long time, some technicians use a piece of duct tape and tape the thermometer to the air vent with the probe inside the grill to catch the air temperature, freeing the arms from holding the thermometer. This allows the technician to save time and perform other tasks as for example to check the refrigerant level or change the filter while the thermometer is taking time to record accurate air temperature. After the technician has recorded the air temperature coming from the air vent and the thermometer is no longer needed, the technician must climb back up the ladder, remove the tape and detach the probe thermometer from the air vent.

To summarize, the probe thermometer is the most accurate device in use today, but it requires the use of a ladder or the like for obtaining air temperature from air vents which is inconvenient and time consuming.

A second type of thermometer is a hand-held infrared laser thermometer which does not require the use of a ladder when seeking air temp from elevated air vents in the ceiling. With the infrared laser thermometer, a technician can be at ground level and shoot an infrared laser beam at the surface of the air vent and get near accurate air temperature. This measurement is displayed on a digital screen that is located on the hand-held device. This thermometer is convenient because no ladder is needed and it can provide temperatures on air vents that are hard to access even with a ladder because of obstructions like furniture or shelves.

However, it is well recognized that these infrared devices display wrong temperature readings; the readings may be so far off the technician knows there is a malfunction. The cause of errors in infrared thermometers include the reflection of radiation from a hotter body rather than radiated by the object measured. Sometimes, especially near ambient temperatures, the readings may be subject to error due to the body of the person holding the instrument. Also, the infrared thermometers do not capture the temperature of the air itself but only of the surface of the grill near the flowing air. For example, a user can take a temperature reading from 8 feet and get a reading of 105° F. At this distance, the user can feel the air from the air vent blowing and assume the reading will be between 75° F. and 80° F., to immediately realize that the reading is wrong.

Moreover, infrared laser thermometers are expensive since they employ infrared technology. In addition, conventionally, the measured temperature readings are temporarily stored in the memory of the thermometer and are then recorded manually by the user. Manually recording the temperature is prone to human errors. Also, the recorded temperature readings are prone to loss since the readings are stored temporarily. Conventionally, there are no ways of extracting the temperature reading from the telescopic thermometer.

To summarize, the infrared thermometer is convenient because no ladder or the like is required to obtain near accurate air temperature readings from an air vent, but it is an unreliable source if an exact air temp is desired by a technician.

Considering the pros and cons of both the probe type and the infrared laser type thermometers, there is need to have a thermometer that would give an accurate air temperature reading like a probe thermometer and at the same time be able to reach air vents and read air temperature of air vents or inside the air vents that are out of reach, without the use of a ladder like a infrared thermometer.

It is extremely important to use accurate air temperature readings in the formula for calibrating the operation of an AC system, called target super heat and sub cooling formula, to obtain a system running at maximum efficiency. Another important formula that requires accurate air temperature measurements is called the "temperature split" which is uses the difference in temperature between the return and supply air temperatures. Temperature split formula is used in almost every service call in the HVAC industry.

Also, there is a need to enable proper record keeping for the temperature readings, in order to enable comprehensive maintenance and repair for HVAC devices.

It is to be noted that while the specification describes the preferred embodiments with reference to the HVAC field, the telescopic thermometer presented here may be used in any other field of activity where remote measurements are necessary.

SUMMARY OF THE INVENTION

It is an object of this specification to provide a telescopic thermometer that allows a user to measure the temperature in places that are difficult to access. The telescopic thermometer described in this specification includes a telescopic body having a temperature sensing unit attached at an end of the body for reaching the place of interest for temperature readings. The device is enabled to measure the temperature on the surfaces of objects (appliances) or the air temperature, as needed.

Another object of the embodiments described in this specification is to provide a device that can be temporarily attached at a place of interest and released at will. In this way, the device can take a plurality of measurements while the user can perform other operations, related or unrelated to the temperature measurements.

Still another object of the embodiments described in this specification is to provide the telescopic thermometer with a display unit provided with a screen and a memory. The memory enables the user to store the temperature readings, alleviating the need for manually recording the temperature readings. The screen enables the user to readily see the temperature readings obtained with the temperature sensor placed at the remote location. The display unit may be enabled with a wireless transmitter to transmit the temperature readings to a networked device such as e.g. a smartphone, or laptop, or the like, over a wireless network. The display unit can also be provided with a microprocessor or a microchip for performing some basic processing of the temperature readings.

Accordingly, this patent specification presents a thermometer system for measuring temperatures, comprising: a telescopic body with a remote end that is adapted to be magnetically attached to a metallic air vent, and a gripping end that is adapted to accept forces that enable positioning of the remote end near the vent; a temperature sensing unit attached to the sensing end, and adapted to collect temperature measurements at the vent; and, a display unit attached to the gripping end and communicatively connected to the temperature sensing unit, the display unit arranged to enable viewing of the temperature measurements received from the temperature sensing unit, wherein the magnetic force of the remote end is strong enough to enable the thermometer system to remain attached to the vent event without any force being applied at the gripping end, after the magnetic sense becomes magnetically attached to the vent.

BRIEF DESCRIPTION OF DRAWINGS

The drawings accompanying and forming part of this specification are included to depict certain aspects of embodiments of the invention. A clearer impression of embodiments of the invention, and of the components and operation of systems provided with embodiments of the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 3B shows a lateral view of the embodiment of FIG. 3A, illustrating further details of the telescopic thermometer in a 90° setup.

DETAILED DESCRIPTION

The various features, details and advantages of the various telescopic thermometer are provided in this specification with reference to the non-limiting embodiments illustrated in the accompanying drawings. Descriptions of well-known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

Figure 1:
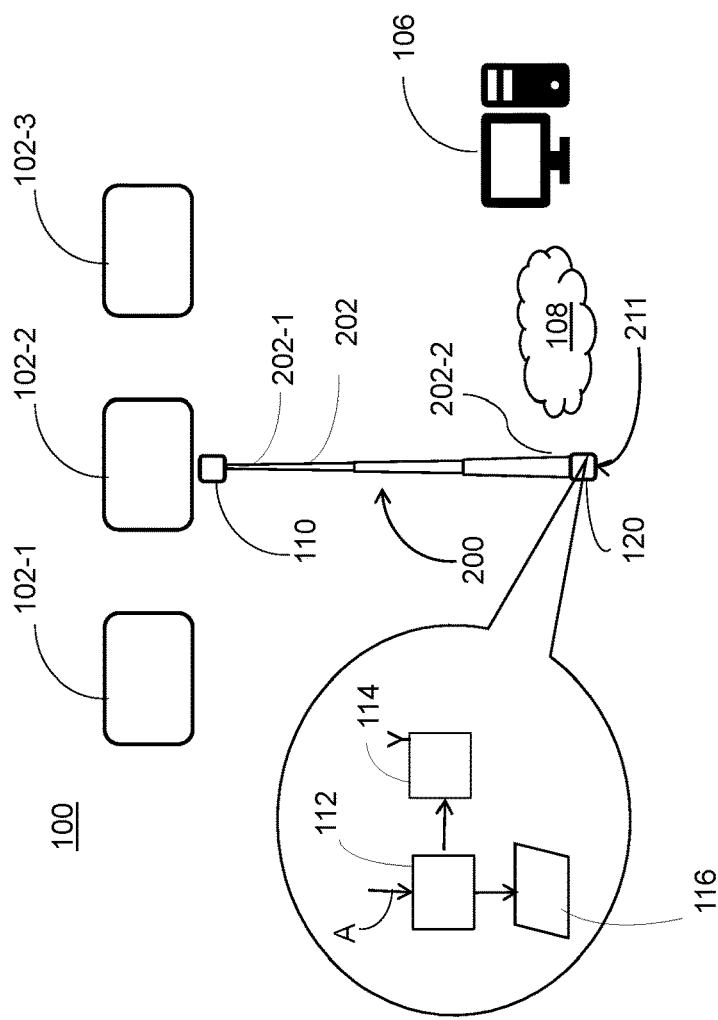
FIG. 1 illustrates an example of a system for temperature measuring using a telescopic thermometer.

FIG. 1 illustrates a system 100 using a telescopic thermometer 200, for measuring the temperature of a plurality of appliances 102-1, 102-2, 102-3, collectively referred to as the appliances 102. In one example, the appliances 102 may be air conditioning units, room heaters, or the like. In the illustrated example, the appliances 102 are installed at a height above ground. As seen, the telescopic thermometer 200 has telescopic body 202 with a first end, also referred to as the remote end 202-1, also referred to as remote end, and a second end, also referred to as the gripping end 202-2. A temperature sensing unit 110 is provided at the at the remote end 202-1 and a display unit 120 is provided at the griping end 202-2.

The temperature sensing unit 110 includes a sensor 204 (see FIG. 2) of a modified probe type connected with the display unit through wires provided through the telescopic body. The sensor may be placed close or on the surface of interest for the temperature measurement by steering the telescopic body 202 from the gripping end 202-2. This enables the user to measure temperatures of objects and places that are out of reach. Also, as seen later, the sensor 204 is provided at the end of a probe 220 that enables its positioning for a particular application. The remote end 202-1 is also provided with a releasable attachment 206 (see FIG. 2) which enables the user to attach the telescopic thermometer to the appliance 102 and detach it at will.

The display unit 120 is provided with a digital display also referred as a screen 116, a processor 112 with a memory (not shown) and a transmitting unit 114. The screen 116 enables the user to see the temperature readings in real time, being placed in a position accessible to viewing by the user, preferably at on a bottom face 211 of the telescopic thermometer 200. The processor 112 receives the measurement signal from the temperature sensing unit 110 as shown by arrow A and processes these measurements to a measurement data format appropriate for viewing on the screen 116. As well, the processor 112 stores the measurement data in its internal memory for future viewing and/or local processing. Transmitter 114 receives the measurement data from the processor and provides it over wireless network 108 to a networked device 106. Alternatively, the networked device 106 can be used to store the temperature reading recorded by the telescopic thermometer 200. In this case, the networked device 106 may perform the processing of the recorded data, if/as needed. The networked device 106 could be for example a smartphone, a tablet, a PDA, a desktop, a laptop, or the like. For example, the wireless network 108 can be a Wi-Fi network, or Bluetooth or both.

It is to be noted that the data processing at the thermometer 200 can be minimal, involving only the display of the temperature readings. Alternatively, the display unit may be more complex and adapted to perform additional processing of the temperature readings that may be required for maintenance and repair of HVAC devices. Alternatively, a wired connection between the thermometer 200 and the device 106 may also be used.

During operation, when the temperature of the appliance surface is to be measured, the user operates the telescopic thermometer 104 to bring the sensor 204 (see FIG. 2) of the temperature sensing unit 110 in contact with the appliance 102. When air temperature is to be measured, the sensor 204 is placed in the space inside the vent, in the air passageway. One or more readings are performed, which are viewed and collected using the display unit 120.

Figure 2:
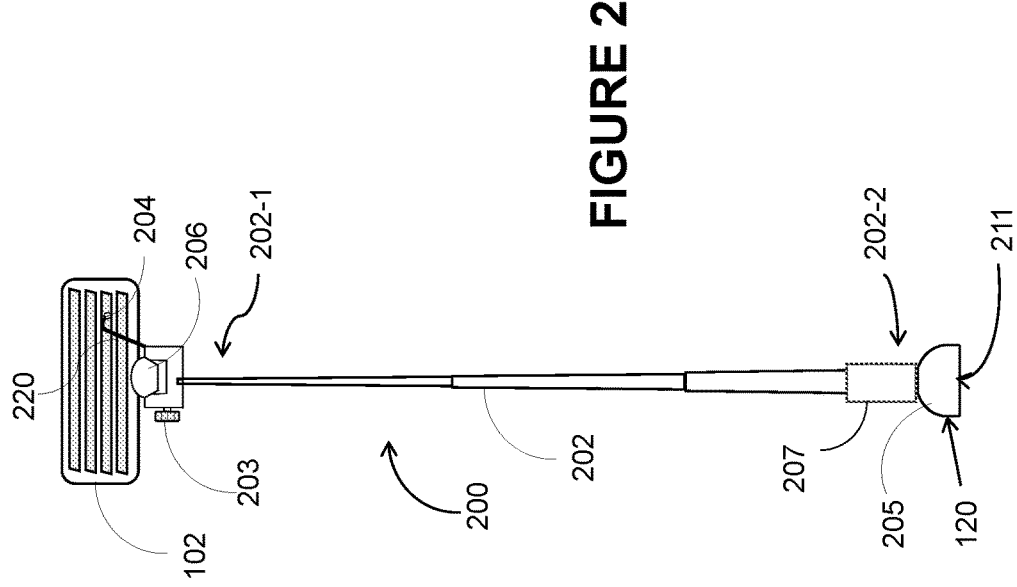
FIG. 2 illustrates an embodiment of the telescopic thermometer.

The structural details of one embodiment of the telescopic thermometer 200 and the manner the telescopic thermometer 200 operates are described with reference to FIG. 2. The telescopic thermometer 200 includes, as indicated above, a telescopic body 202 that has a variable length. FIG. 2 also shows the remote end 202-1 of the telescopic body 202, also referred as the first end, and the griping end 202-2, also referred to as the second end. Sensor 204 of the temperature sensing unit 110 (see FIG. 1) is placed at the end of probe 220.

Telescopic thermometer 200 also includes a releasable attachment 206 adapted to releasably attach the thermometer 200 to an appliance or a nearby point of interest. Preferably, this may be a magnetic head 206 provided at the remote end 202-1. Further, the telescopic thermometer 200 includes a thumb lock at the remote end 202-1 for controlling the releasable attachment 206. In one example, once the user has placed the temperature sensor 204 at the place whose temperature is to be measured, the magnetic head 206 attaches the body 200 to the appliance 102 such that the sensor 204 assumes a desired position, which is a position in the air path exiting the vent in the example of FIG. 2, in this example. In one example, the magnetic head 206 can be made of a small earth magnet. For instance, the small earth magnet can be a rare earth magnet. Alternatively, the arrangement to releasably attach the thermometer may be a mechanical device, such as a clasp, hook or any type of removable, mechanical attachment. As indicated above, the use of the thermometer 200 is not limited to measuring air temperature; it could be used as well to measure the temperature on the surface of appliances of interest. If the temperature of a surface were to be measured, the sensor would be placed in contact with that surface.

In this example, to attain the place of interest in the air passageway, the probe 220 with the sensor 204 is arranged in a position suitable for the respective environment, which appliance in this example is the vent register 102. Then, the user will simply extend the telescopic body 202 to a length allowing him/her to reach the vent register while standing on the ground/floor level and place the sensor 204 in the air passageway inside the vent register 102.

The telescopic thermometer 200 may include a gripper 207 at the second end 202-2, shaped to enable the user to firmly hold the telescopic body 202. As well, the second end 202-2 may be provided with a housing 205 for the display unit 120. As indicated above, the screen 116 is provided on the bottom face 221 of the housing 205, to enable the user to see the temperature readings measured by the temperature sensor 204 in real time, from a position under the thermometer. In one example, the display unit is connected to the temperature sensor 204 by a wire that runs through the telescopic body 202, as seen for example in FIG. 3B.

During operation, the screen 116 receives the temperature readings from the temperature sensor 204 and displays the temperature readings to the user. In this setting, the wireless module 114 relays the temperature readings to the network device 106 for storing and processing, thereby eliminating the need of manually recording the temperature reading by the user. As indicated above, the display unit 120 may include a local memory for storing the temperature readings for future use (viewing or transmission, or both).

Figure 3A:
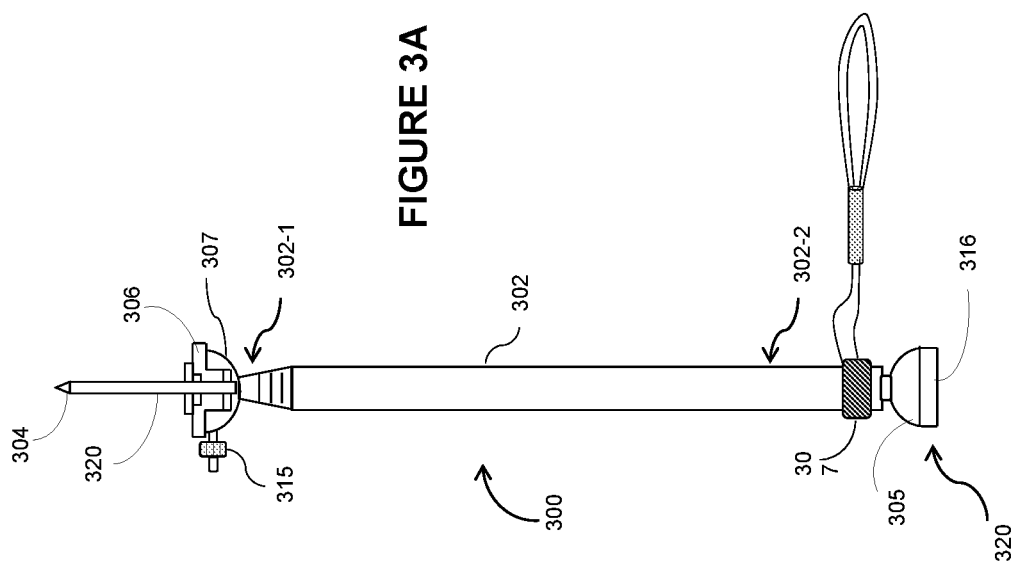
FIG. 3A shows a front view of another embodiment of the telescopic thermometer in an 180° setup.

FIGS. 3A and 3B, collectively referred to as FIG. 3, show another embodiment of the telescopic thermometer, denoted with 300. Similar to the embodiment of FIG. 2, telescopic thermometer 300 includes a telescopic body 302 with a first end 302-1 equipped with a temperature sensing unit, and a second end 302-2, equipped with a display unit.

The temperature sensing unit in this embodiment includes an elongated, flexible temperature probe 320, with a diode element (the sensor) 304 at the end of the probe. The flexible temperature probe 320 is preferably 3-4 inches long and completely flexible to all angles. As a comparison, the flexible temperature probe 320 is flexible like a piece of 12-gauge romex wire that can bend at a certain angle and then keeps its position. The actual material the flexible probe 320 is made of is a hollow stainless-steel flexible conduit. Two very thin gauge probe wires are ran inside the conduit and connected to the diode element 304 at the tip of the probe which is used as a sensor.

The flexibility of the probe 320 carrying the sensor 304 provides significant advantages over the conventional probe thermometers used currently in the HVAC field, which are always rigid and straight, though the entire device can be positioned in many different angles. The current rigid straight probes used in the HVAC industry, although accurate, are limited in the ability to enter remote, difficult to reach places, as for example an internal air vent register, because they cannot get past the curved blades of a register grill easily. Even when penetration between the blades of a register is achieved by a conventional probe, the tip of the probe will be shallow in the air stream and the available adjustments are minimal. In contrast, the flexible probe 320 is much more versatile in terms of being able to enter deep in between the curved blades of a metal air vent register so the probe can be put inside the vent and in direct path of flowing conditioned air where there is no other unconditioned ambient air that can mix with the targeted conditioned air and cause an inaccurate air temperature reading. The ability to place the sensor inside the air vent register where only conditioned air is present is vital in successfully recording the most accurate temperature reading as possible. This mode of operation enables the user to obtain accurate air temperature readings that may be then used by the target super heat and sub cooling formula, and by the temperature split formula for calibrating the operation of an AC system, to obtain a system running at maximum efficiency.

The temperature sensing unit 310 of telescopic thermometer 300 also includes releasable attachment 306 enabled to releasably attach the thermometer 300 to an appliance or a nearby point of interest. In the embodiment of FIG. 3, the attachment 306 includes an adjustable magnetic swivel head 307. The adjustable magnetic swivel head 307 is placed at the very top of the telescopic body 302. The purpose of the magnetic swivel head 307 is enable a technician to attach the entire telescopic thermometer 300 magnetically to a metal air vent register located high on the ceiling or high on a wall, while standing on the floor, without the use of a ladder.

As in the embodiment of FIG. 2, a display unit 320 is provided at the gripping end of the telescopic body 302. This unit preferably includes an electronic temperature display (screen) 316 facing downwards when the thermometer 300 is in the vertical position, so that when the technician is below the dangling thermometer 300 he/she can look upwards at the screen 316 and read the temperature being recorded by the flexible probe 320 with sensor 304 placed inside the air vent. This gives the technician a major advantage, as it provides him/her with the best of both worlds: the accuracy of a conventional electronic probe thermometer and the ability to reach high elevated air vents without a ladder just like an infrared laser thermometer. In addition, it enables the technician to perform other operations while the thermometer performs the measurement, including noting the readings.

In one embodiment, the display unit 320 and the sensor 304 are connected to each other by two very thin gauge wires 322, 324 that are housed together in a single plastic-coated shell 318 that is a coil and acts like a slinky, as seen in FIG. 3B. FIG. 3B shows the inside of the body 302 and of the probe 320. When the telescopic body 302 is extended to full length, the slinky coil 318 uncoils, and recoils when the thermostatic body is retracted to ensure that the wire connections are not in danger of being pulled out by pressure when the body 302 is extended or crushed when the body is retracted. The wires 322, 324, exiting the slinky coil 318 are connected to the display unit 320 at the gripping end, as shown in the enlargement B in FIG. 3B. At the remote end, the wires 322, 324 exit the slinky coil 318 and connect to the wires 342, 344. The wires 342, 344 are housed in a protective plastic shell 316 to ultimately connect the sensor 304 to the display unit. This arrangement is shown in enlargement C. Alternatively, the wires 342, 344 may run unprotected inside the probe 320.

The magnetic swivel head 307 is also unique because it has the ability to lock in angles within one radian. This feature is provided for air vents in other settings than the ceiling. Not all air vents are placed up on a horizontal ceiling. It is common for air vents to be placed high on a vertical wall, for example, right above a bedroom door. In this scenario, in order for the magnetic swivel head 307 to stick properly to the grill on a vertical wall, the proper angle would need to be locked in on the magnetic swivel head 307. For example, in the first scenario the air vent register was on the horizontal ceiling. In such a scenario, the surface of the magnetic swivel head 37 had to be locked in at a 90° angle with the magnets pointing up, as shown in FIG. 3B. In the second scenario, with the air register on the vertical wall, the magnetic surface must be locked in at an 180° angle with the magnet pointing toward the wall and the thermometer body 302 parallel with the vertical wall, as shown in FIG. 3A. This angle allows the magnet to support the weight of the entire thermometer 300. Before the magnetic swivel head 307 is raised up and attached to the air vent the flexible probe 320 will also need to be bent into a near 180° angle direction so when the magnetic swivel head is raised and attached to the air vent the flexible probe 320 easily enters between the blades of the air vent register and into the internal stream of the conditioned air.

Figure 4B:
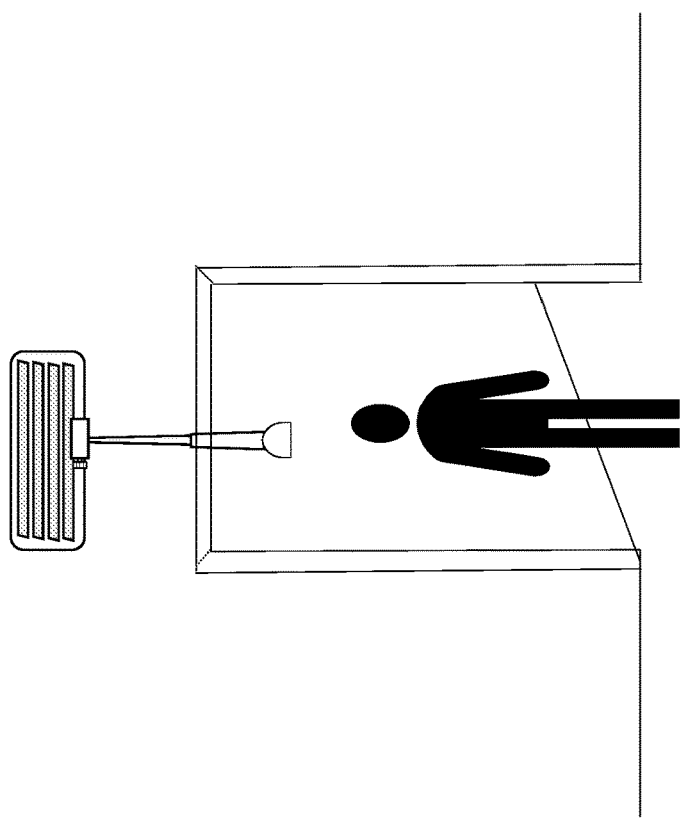
FIGS. 4A and 4B show the telescopic temperature device in operation.
Figure 4A:
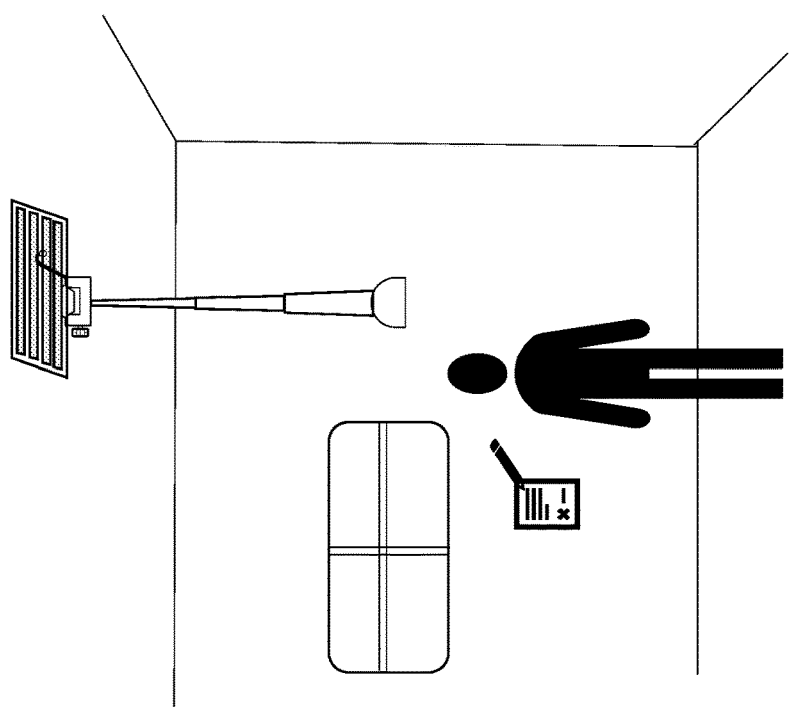

FIGS. 4A and 4B show the mode of operation of the telescopic thermometer 300 in two different scenarios. For example, a technician will enter a home and locate an air vent register in the ceiling. The technician would then take out his telescopic thermostat 300, extend the telescopic body 302 to a length that would reach the metal air vent register, then extending his arms towards the ceiling with his hands on the gripper end 302-2 raising the magnetic swivel head 307 up towards the metal air vent and attaching the magnet surface of the head to the metallic air vent register magnetically, while positioning the flexible probe 320 inside the air vent register in direct contact with the conditioned air stream. The technician needs also to ensure that the probe is not in contact with any surface, if the air temperature measurement is to be measured.

After the magnetic swivel head 307 has been attached magnetically to the air vent register, the technician would let go of the entire thermometer unit 300 from the gripping end 302-2 and leave the thermometer 300 stuck to the air vent with the extended telescopic body 302 dangling from the air vent in midair, with the gripping end 302-2 of the of the thermometer 300 over the head of the technician, within arm length. In this way, the technician will be able to pull and detach the thermometer 300 from the vent after the temperature measurement.

Other advantages are while the telescopic thermostat 300 is stuck to the air vent and reading air temperature, it takes a few minutes for the warm probe to cool down to the accurate air temperature. While the probe cool-down takes place, the technician hands are free to perform other tasks involved in an a/c repair. For example, the technician can check the refrigerant pressure or change the air filter.

After any additional tasks are complete, the technician will return to the telescopic thermostat 300 that is dangling from the air vent, look up at the screen 309 and record the temperature. The technician will then grab the bottom gripper that is within arm reach, pull down and detach the magnetic swivel head 307 from the air vent register. The technician will then push down on the telescopic body 302 to retract it to its smallest length, then put it away in a tool bag to most likely be used again on the next service call.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. Other variations and modifications of the embodiments described and illustrated herein are possible in light of the teachings herein and are to be considered as part of the spirit and scope of the invention.

I claim:

1. A thermometer system for measuring temperatures comprising:
   a telescopic body with a remote end that is adapted to be magnetically attached to a metallic air vent and a gripping end that is adapted to accept forces that enable positioning of the remote end near the metallic air vent;
   a temperature sensing unit attached to the remote end, and adapted to collect temperature measurements at the metallic air vent; and
   a display unit attached to the gripping end and communicatively connected to the temperature sensing unit, the display unit arranged to enable viewing of the temperature measurements received from the temperature sensing unit,
   wherein the magnetic force of the remote end is strong enough to enable the thermometer system to remain attached to the metallic air vent event without any force being applied at the gripping end, after the remote end becomes magnetically attached to the metallic air vent
   wherein the remote end comprises:
   a metal probe attached to the telescopic body at the remote end having a tip; a sensor provided at the tip of the probe;
   a releasable attachment controllable from the remote end, that is adapted to magnetically attach the sensing end to the vent to enable hands-free operation of the thermometer system,
   wherein the remote end comprises a thumb lock for controlling the releasable attachment,
   wherein a magnetic head comprises an adjustable magnetic swivel head, adapted to enable positioning of the probe relative to the telescopic body at a plurality of angles.

2. The thermometer system of claim 1, wherein the temperature sensing unit includes a metal probe with a temperature sensor at the tip of the metal probe.

3. The thermometer system of claim 1, wherein the display unit comprises a digital screen electrically connected with the sensor unit over wires running through the telescopic body.

4. The thermometer system of claim 1, wherein the display unit comprises:
   a processor for converting the temperature measurements received from the temperature sensing unit into temperature data;
   a digital screen connected to the processor for displaying the temperature data; and
   a memory for storing the temperature data for future processing.

5. The thermometer system of claim 4, wherein the display unit further comprises a transmitting unit for transmitting the temperature data to a networked device over a wireless network.

6. The thermometer system of claim 5 wherein the networked device is a smartphone.

7. The thermometer system of claim 1, wherein the temperature sensing unit includes a flexible probe with a temperature sensor at its tip adapted to enable positioning of the temperature sensor at a plurality of angles relative to the telescopic body.

8. The thermometer system of claim 7, wherein the flexible probe is 3-4 inches long.

9. The thermometer system of claim 1, wherein the display unit and the temperature sensing unit are electrically connected over a first pair of wires running inside the telescopic body.

10. The thermometer system of claim 9, wherein the first pair of wires is protected in a single coil shaped protective shell that maintains wires of the first pair coiled when the telescopic body is retracted and uncoiled when the telescopic body is fully extended.

11. The thermometer system of claim 9, wherein the first pair of wires is connected at the remote end with a second pair of wires running through the probe to the temperature sensor.

12. The thermometer system of claim 9, wherein the first pair of wires is connected at the gripping end to the display unit.

13. The thermometer system of claim 1, wherein the temperature sensing unit is placed inside an air vent register to measure the temperature of an air flow provided by an air conditioning (AC) unit.

14. The thermometer system of claim 1, wherein the temperature sensing unit is placed on the surface of a part of interest of an air conditioning (AC) unit to measure the temperature at the surface of the part of interest.

15. The thermometer system of claim 1, wherein the telescopic body can be extended to enable the remote end to be separated from the gripping end, to the extent required for a person holding the gripping end to magnetically attach the remote end to a vent on the ceiling of a room.

16. The thermometer system of claim 1, wherein the telescopic body can be extended to enable the remote end to be separated from the gripping end, to the extent required for a person holding the gripping end to magnetically attach the remote end to a vent at any location on the wall of a room.

17. The thermometer system of claim 1, wherein the remote end comprises a small earth magnet.

* * * * *